US008145420B2

(12) United States Patent
Chappell et al.

(10) Patent No.: US 8,145,420 B2
(45) Date of Patent: Mar. 27, 2012

(54) METHOD AND APPARATUS FOR JOINING TOGETHER PORTIONS OF A GEOMETRIC ASSEMBLY

(75) Inventors: Charles D. Chappell, Treasure Island, FL (US); Edward Burroughs, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 660 days.

(21) Appl. No.: 12/333,031

(22) Filed: Dec. 11, 2008

(65) Prior Publication Data

US 2010/0153012 A1    Jun. 17, 2010

(51) Int. Cl.
*G01C 21/00* (2006.01)
(52) U.S. Cl. ........................................ 701/220
(58) Field of Classification Search .................. 701/220; 73/493, 510, 514.01, 178 R
See application file for complete search history.

(56) References Cited

U.S. PATENT DOCUMENTS

| | | | |
|---|---|---|---|
| 2,363,260 A * | 11/1944 | Peskin | 384/311 |
| 3,473,688 A | 10/1969 | Rosfelder | |
| 3,492,944 A | 2/1970 | Reaves et al. | |
| 3,596,523 A | 8/1971 | Clark | |
| 3,767,890 A | 10/1973 | Madden, Jr. | |
| 3,769,710 A * | 11/1973 | Reister | 33/320 |
| 4,291,926 A * | 9/1981 | Tomioka et al. | 384/311 |
| 4,779,900 A | 10/1988 | Shumard | |
| 6,082,923 A | 7/2000 | Maughan | |
| 6,170,795 B1 | 1/2001 | Wayne | |
| 7,003,399 B1 * | 2/2006 | Chappell | 701/220 |
| 7,103,956 B2 | 9/2006 | Tessien | |
| 7,425,097 B1 * | 9/2008 | Chappell et al. | 384/109 |
| 7,762,133 B2 * | 7/2010 | Chappell et al. | 73/493 |
| 2006/0058961 A1 * | 3/2006 | Chappell et al. | 701/220 |
| 2011/0127365 A1 * | 6/2011 | Chappell | 244/3.2 |

FOREIGN PATENT DOCUMENTS

| | | |
|---|---|---|
| EP | 1126098 | 8/2001 |
| FR | 861335 | 2/1941 |
| NL | 8502319 | 3/1987 |
| WO | 2006065892 | 6/2006 |

OTHER PUBLICATIONS

European Patent Office, "European Search Report", Nov. 3, 2010, Published in: EP.

* cited by examiner

*Primary Examiner* — Faye M. Fleming
(74) *Attorney, Agent, or Firm* — Fogg & Powers LLC

(57) ABSTRACT

A housing comprises at least first and second portions. The first and second portions mate with each other at respective joining regions. The first and second portions each comprise a respective tapered flange along the joining region. The first and second portions of the housing are connected to each other by placing a plurality of collars over the tapered flanges of the first and second portions of the housing. Each of the collars has a respective groove formed therein. The grooves of the plurality of collars are placed over the tapered flanges of the first and second portions of the housing. A plurality of fasteners causes the plurality of collars to press the first and second portions of the housing together. In one embodiment, the housing is used in a sensor block assembly that is part of an inertial measurement unit.

20 Claims, 9 Drawing Sheets

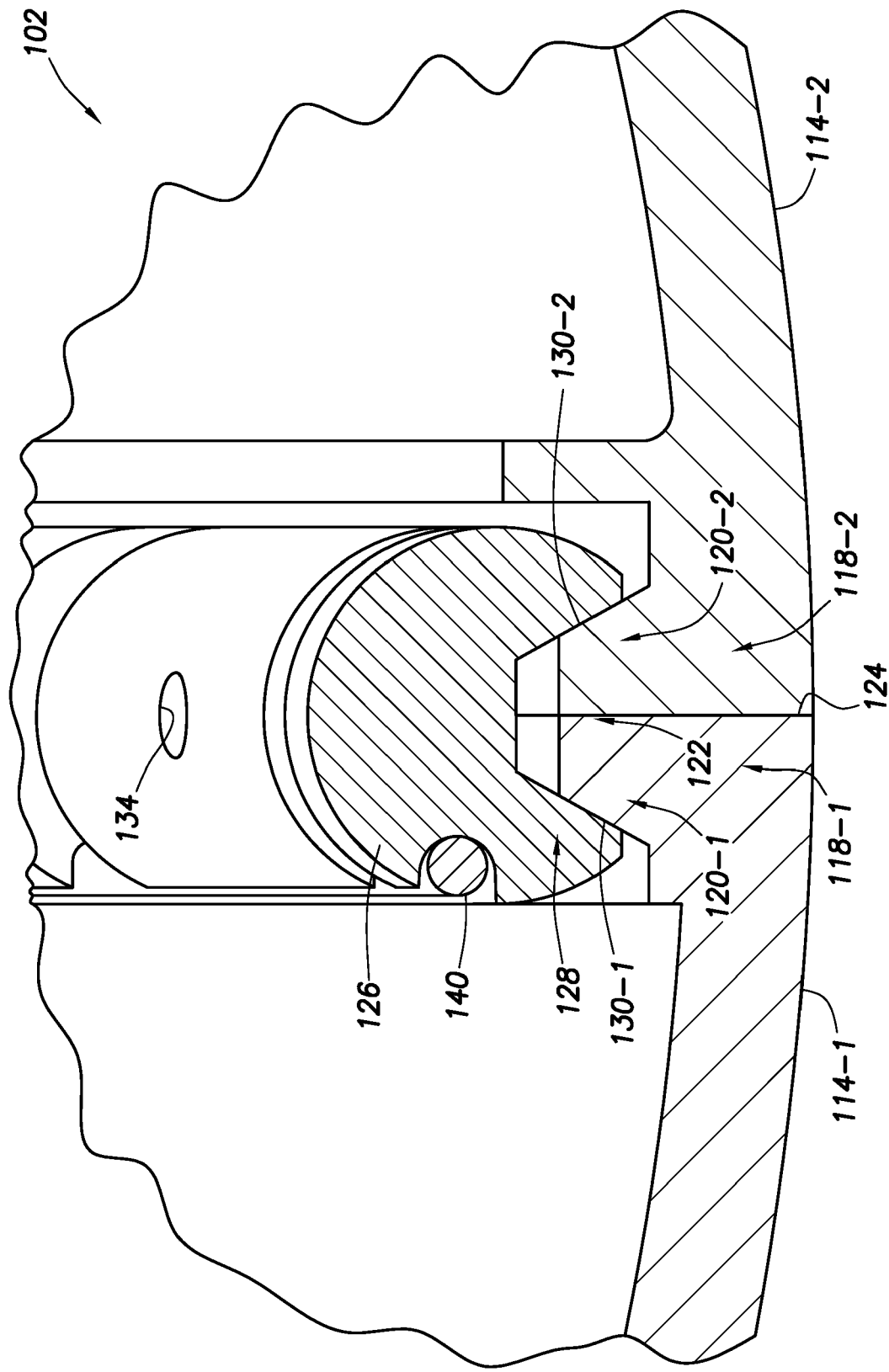

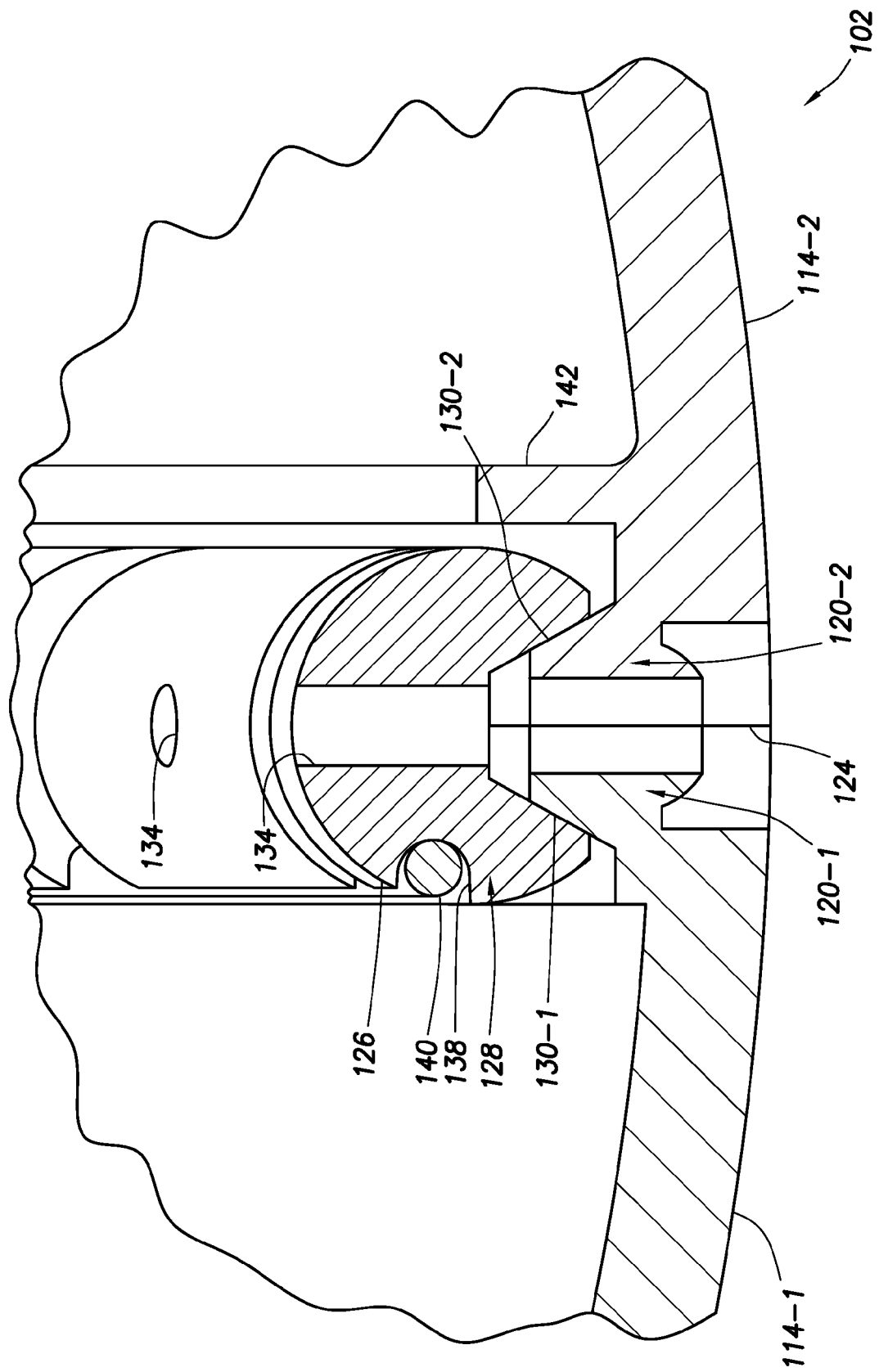

METHOD AND APPARATUS FOR JOINING TOGETHER PORTIONS OF A GEOMETRIC ASSEMBLY

STATEMENT REGARDING FEDERALLY SPONSORED RESEARCH OR DEVELOPMENT

This invention was made with Government support under Contract No. FA-9453-08-C-0162 awarded by the US Air Force. The Government has certain rights in the invention.

CROSS-REFERENCE TO RELATED APPLICATION

This application is related to the following United States patents and patent applications, all of which are hereby incorporated herein by reference:

U.S. patent application Ser. No. 11/004,184, filed on Dec. 3, 2004, entitled "GAS SUPPORTED INERTIAL SENSOR SYSTEM AND METHOD" (the '184 application);

U.S. Pat. No. 7,340,344, filed on Dec. 3, 2004, entitled "SPHERICAL POSITION MONITORING SYSTEM" (the '344 patent);

U.S. Pat. No. 7,289,902, filed on Dec. 3, 2004, entitled "THREE DIMENSIONAL BALANCE ASSEMBLY" (the '902 patent);

U.S. Pat. No. 7,003,399, filed on Dec. 3, 2004, entitled "GAS JET CONTROL FOR INERTIAL MEASUREMENT UNIT" (the '399 patent);

U.S. Pat. No. 7,366,613, filed on Dec. 3, 2004, entitled "RF WIRELESS COMMUNICATION FOR DEEPLY EMBEDDED AEROSPACE SYSTEMS" (the '613 patent);

U.S. patent application Ser. No. 11/004,452, filed on Dec. 3, 2004, entitled "ARTICULATED GAS BEARING SUPPORT PADS" (the '452 application); and U.S. patent application Ser. No. 11/004,517, filed on Dec. 3, 2004, entitled "GENERALIZED INERTIAL MEASUREMENT ERROR REDUCTION THROUGH MULTIPLE AXIS ROTATION DURING FLIGHT" (the '517 application).

BACKGROUND

One type of inertial navigation system (INS) employs an inertial measurement unit (IMU) that is floated in gas. Floating the IMU in gas creates a near frictionless environment to enable the IMU to move in all directions. By enabling motion in all directions, complete calibration utilizing earth gravity and earth rate is possible. By floating the IMU in gas, the need for gimbals and ball bearings is eliminated, thereby reducing the complexity, size, and cost of the inertial navigation system. Also, by eliminating gimbals, ball bearings, and other moving physical structures, there is typically no wear on the physical structures from contact between rotating surfaces, which improves the accuracy and durability of such an INS. Examples of such an INS are described in the '184 application.

In one exemplary implementation of an INS that uses a gas-supported IMU, the IMU is housed within a spherical sensor block. Typically, such a spherical sensor block is formed as two hemispheres. The two hemispheres are attached to one another using a main shaft that extends from one hemisphere and is connected to the other hemisphere. In order to balance the two hemispheres, the main shaft includes a three dimensional balance assembly comprising a center shaft with two or more eccentric weighted shafts encompassing the center shaft. These weighted shafts can be used to balance the overall assembly. One example of such a spherical sensor block is described in the '902 patent.

When joining the two hemispheres of such a spherical sensor block together, it is important that distortion of the sphere be kept below a minimum threshold limit. It is also important to keep slippage between the hemispheres during high G level environments below a minimum threshold limit. One example of where this may be a concern is during the launch of a vehicle in which the sensor block is deployed. For example, the relative angular position of internal instruments housed within the sensor block must be held to very small tolerances during G loading. This dictates very precise alignment to be maintained between the two hemispheres. Distortion or slippage of the hemispheres would cause the sensor block to be less spherical, which could result in instrument axis alignment error. Minimizing tolerance conflicts between the two portions of the sphere helps to reduce shifting during loads or thermal excursion of the assembly.

The joining together of two portions of a sphere with an axle, as described in the '902 patent, typically puts a load on the sphere, which may distort the sphere. In some applications, such distortion may be beyond acceptable limits. The axle passes through the center of the spherical assembly and may interfere with internal components in some applications.

Another possible approach to joining the two hemispheres is using a tongue-in-groove mechanical joint. However, such mechanical joints often have tolerance conflicts or require match machining of two parts, which does not allow for interchangeability with other parts. Generally, it is desirable to manufacture the two hemispheres independent of one another so one can be interchangeable with another having a different design, manufacturing date, or source.

Also, as noted above, the sensor block must be balanced properly to enable free rotation. Typically, the sensor block must be disassembled to balance the sensor block. Adjustment of final fine balance from the outside of the assembled sphere is desirable in order to obtain consistent results with minimal assembly/disassembly time.

SUMMARY

In one embodiment, an apparatus comprises a housing, which comprises at least first and second portions. The first and second portions mate with each other at respective joining regions. The first and second portions each comprise a respective tapered flange along the joining region. The first and second portions of the housing are connected to each other by placing a plurality of collars over the tapered flanges of the first and second portions of the housing. Each of the collars has a respective groove formed therein. The grooves of the plurality of collars are placed over the tapered flanges of the first and second portions of the housing. A plurality of fasteners causes the plurality of collars to press the first and second portions of the housing together.

In another embodiment, an inertial navigation system comprises a navigation unit and an inertial measurement unit communicatively coupled to the navigation unit. The inertial measurement unit comprises a sensor block and a plurality of gas pads. The gas pads are configured to suspend the sensor block in gas. The sensor block comprises a housing comprising at least first and second portions. The first and second portions mate with each other at respective joining regions. The first and second portions each comprise a respective tapered flange along the joining region. The first and second portions of the housing are connected to each other by placing a plurality of collars over the tapered flanges of the first and second portions of the housing. Each of the collars has a respective groove formed therein. The grooves of the plurality of collars are placed over the tapered flanges of the first and second portions of the housing. A plurality of fasteners causes the plurality of collars to press the first and second portions of the housing together.

Another embodiment is directed to a method for clamping at least a first portion and a second portion of a housing for an apparatus. The first and second portions mate with each other at respective joining regions. The first and second portions each comprise a respective tapered flange along the joining region. The method comprises positioning a plurality of collars over the tapered flange of the first portion of the housing. The method further comprises joining at least the second portion to at least the first portion. The plurality of collars is positioned over the tapered flanges the first and second portions. The method further comprises fastening at least the first portion to at least the second portion using a plurality of fasteners that engage the plurality of collars.

The details of various embodiments of the claimed invention are set forth in the accompanying drawings and the description below. Other features and advantages will become apparent from the description, the drawings, and the claims.

DRAWINGS

FIGS. 3A-3D are various views illustrating the joining together of first and second portions of the housing of the sensor block of show in FIGS. 2A and 2B.

Like reference numbers and designations in the various drawings indicate like elements.

DETAILED DESCRIPTION

Figure 1:
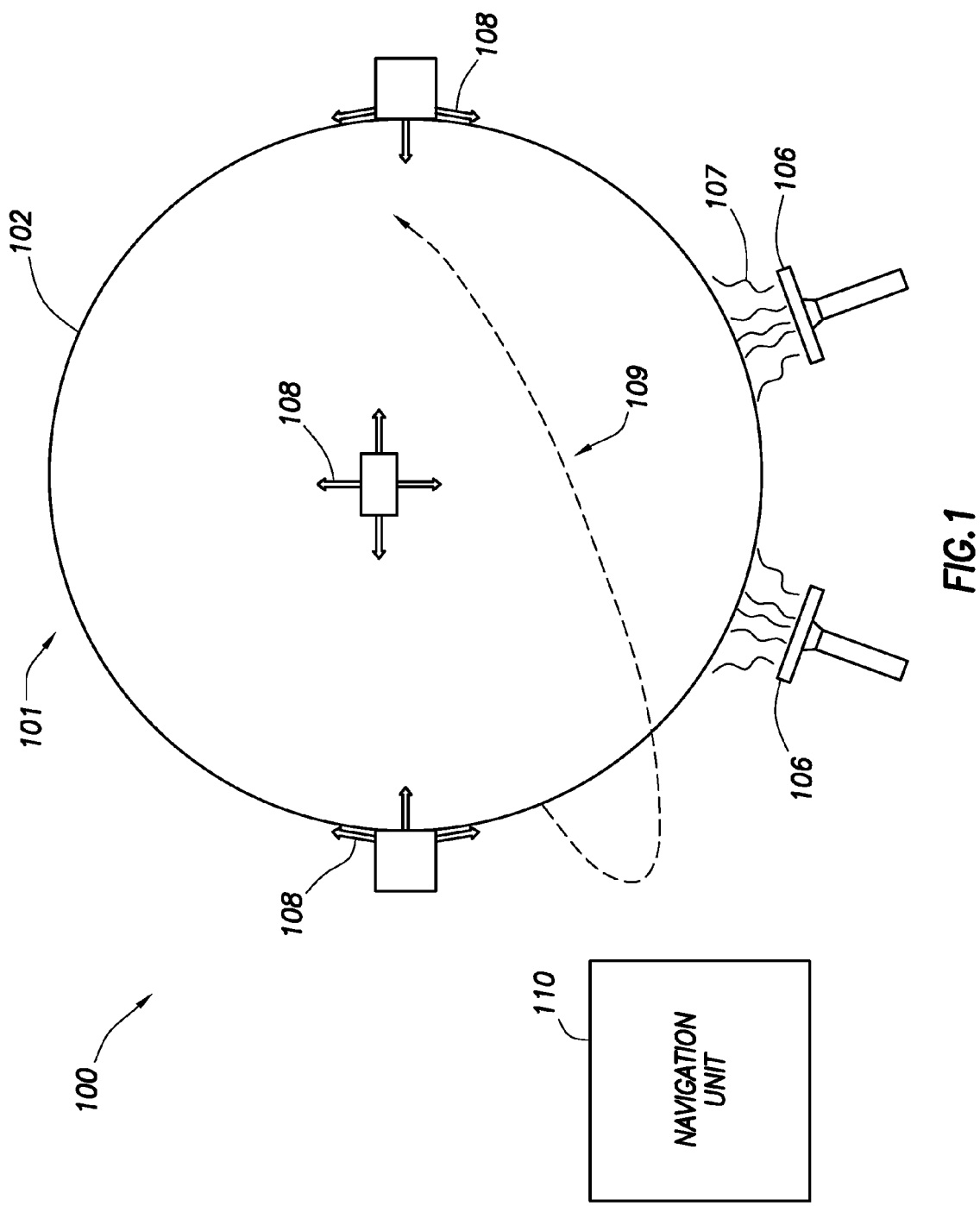
FIG. 1 is a block diagram of one embodiment of an inertial navigation system.

FIG. 1 is a block diagram of one embodiment of an inertial navigation system (INS) 100. The INS 100 includes an inertial measurement unit (IMU) 101 that is floated in gas. In particular, the IMU 101 comprises a sensor block 102 (also referred to as sensor block assembly 102) that houses one or more instruments or sensors 104 (shown in FIG. 2) for monitoring (or otherwise generating signals or information indicative of) angular position, acceleration, calibration and the like.

The system 100 further includes one or more gas pads 106 and one or more gas jet assemblies 108 that are positioned around the sensor block 102. In such an embodiment, pressurized gas is supplied to, and flows out from, the gas pads 106 and the gas jet assemblies 108. The gas flowing from the gas pads 106 is used to pressurize the gap between the gas pads 106 (and an enclosure for the sensor block 102 (not shown)) and the sensor block 102, which causes the sensor block 102 to float in the gas. This creates a near frictionless environment free of any physical contact. The sensor block 102 is shown supported (or floated) within the gas bearing 107 generated by the gas pads 106. In the particular embodiment shown in FIG. 1, the gas flowing from the gas jet assemblies 108 is used to rotate the sensor block 102 (for example, by releasing gas from the gas jet assemblies 108 in short pulses or bursts). The gas jet assemblies 108 are used to move the sensor block 102 in various directions and into various positions, and are typically used in the calibration of the sensors 104 housed within the sensor block 102. Reference number 109 generally illustrates an example of a rotational motion of the sensor block 102.

The system 100 further includes a navigation unit 110 to control the operation of the various components of the system 100 and to process the information output by the sensors 104 housed within the sensor block 102 (for example, to generate a navigation solution using the information output from the sensors 104 housed within the sensor block 102). The sensors 104 are in wireless communication with the navigation unit 110.

Additional information about such an embodiment is set forth in the '344 patent, the '399 patent, the '184 application, and the '452 application.

Figure 2A:
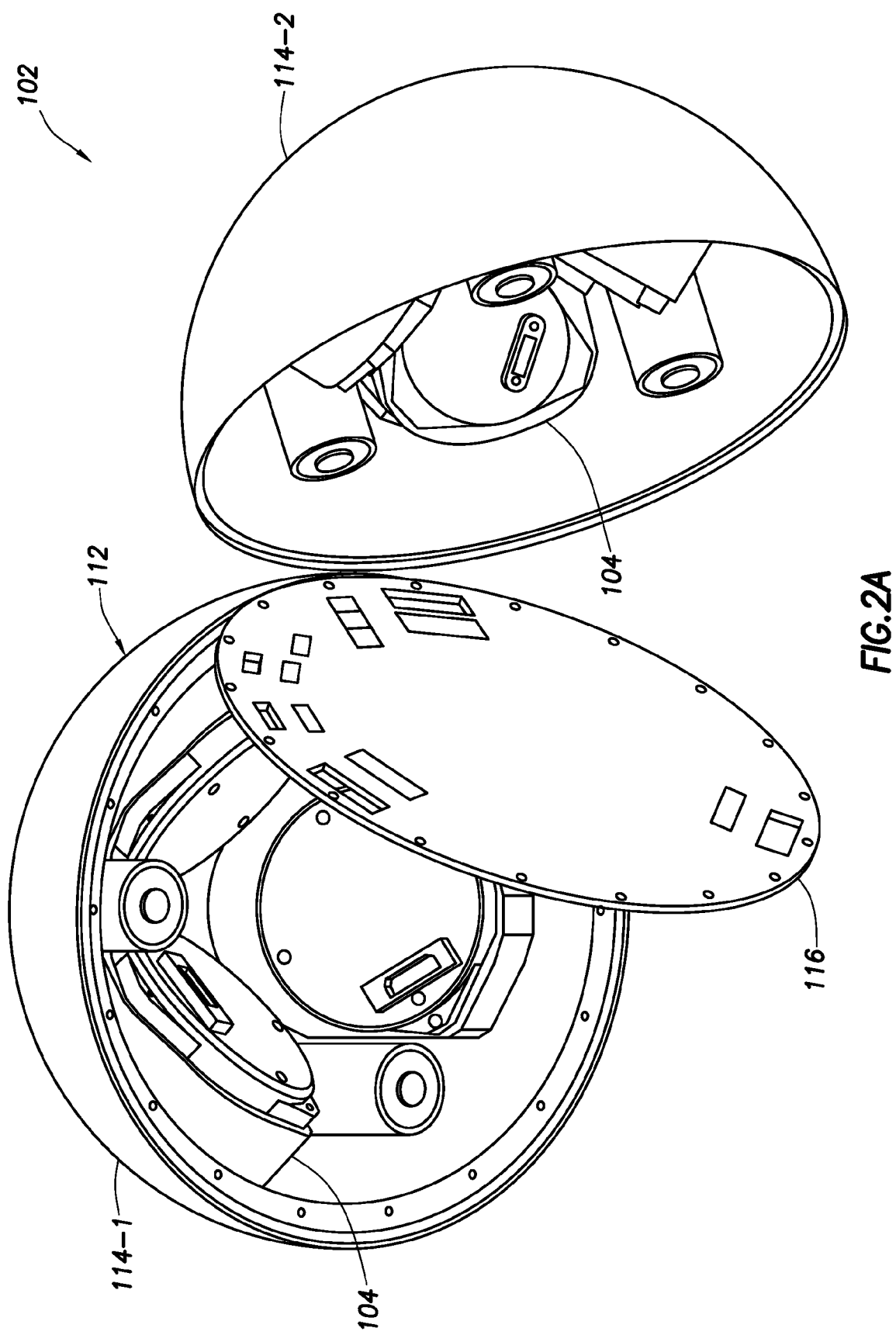
FIGS. 2A and 2B show one embodiment of a sensor block suitable for use in the system of FIG. 1 in an unassembled or open state and an assembled state, respectively.
Figure 2B:
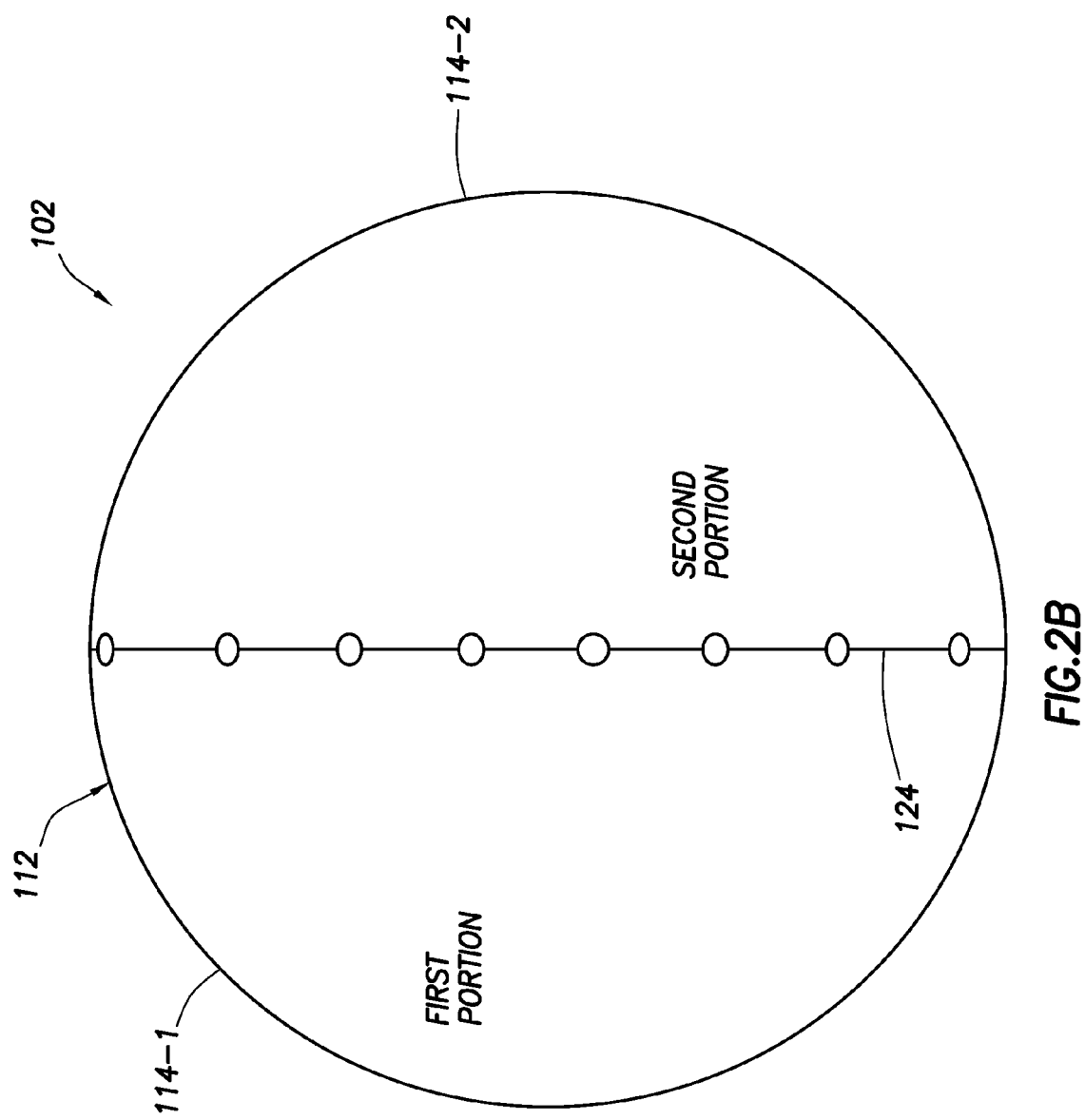

FIGS. 2A and 2B show one embodiment of a sensor block 102 suitable for use in the system of FIG. 1. The sensor block 102 comprises a housing 112 that is formed out of two or more portions 114 that are connected to one another (using techniques described herein) when the sensor block 102 is assembled. FIG. 2A shows the sensor block 102 in an unassembled or open state, and FIG. 2B shows the sensor block 102 in an assembled state. In the particular embodiment shown in FIGS. 2A-2B, the housing 112 of the sensor block 102 comprises two substantially equal hemispherical portions 114 (referred to individually as first and second portions 114-1 and 114-2). In such an embodiment, the portions 114 are formed from aluminum or any other suitable material. In one implementation of such an embodiment, the housing 112 (and the portions 114 thereof) is formed with a quarter-inch thick aluminum wall.

The circumference 124 of the housing 112 where the first and second portions 114-1 and 114-2 mate when the housing 112 is assembled is referred to here as the "joining circumference" 124.

Sensor block 102 further includes a divider 116 connected to both the hemispherical portions 114 of the housing 112. In the particular embodiment shown in FIGS. 2A-2B, the divider 116 comprises a circuit board having a disk shape and includes one or more electronic components mounted thereon. In alternate embodiments, divider disk 116 has no electronic components mounted thereon or the sensor block 102 does not include a divider 116 and any electronics are mounted at other locations within housing 112.

Each of the instruments or sensors 104 is mounted to the inside of the housing 112 in a particular position. The housing 112 also protects the instruments 104 from vibrations, thermal variations, radiation and other environments that could degrade the sensors 104. In one implementation of the embodiment shown in FIGS. 2A-2B, the sensors 104 housed within the sensor block 102 include an arrangement of three accelerometers and three gyroscopes that are used to generate a position and attitude estimate for a vehicle (or other device) in which the system 100 is deployed. Accelerometers are inertial sensors that sense a linear change in rate (that is, acceleration) along a given axis. Gyroscopes are inertial sensors that sense angular rate (that is used to determine, rotational velocity or angular position). In such an implementation, the three accelerometers are typically oriented around three mutually orthogonal axes (for example, the x, y, and z axes) and the three gyroscopes are typically oriented around three mutually orthogonal axes (for example, pitch, yaw, and roll axes). The outputs of the sensors 104 are processed by, for example, the navigation unit 110.

Although a particular embodiment of the system 100 and sensor block 102 are shown in FIGS. 1 and 2A-2B, it is to be understood that other embodiments are implemented in other ways. For example, sensor blocks can have other numbers of portions, or portions having unequal sizes or volumes.

In some applications, the embodiment of the sensor block 102 shown in FIGS. 1 and 2A-2B needs to keep within a minimum threshold limit to its intended shape over many environmental factors. Environmental changes that the sensor block 102 may experience include a temperature range from about 60 degrees Fahrenheit to about 130 degrees Fahrenheit. The sensor block 102 may be exposed to high G level forces, such as 20 Gs. Exposure to radiation may cause the sensor block 102 to heat unevenly. Also, the pressure load in the initial assembly of the sensor block 102 could cause uneven loading, such as up to 100 lbs. Despite these environmental conditions, the sensor block 102 should maintain stability within a threshold limit for a period of time, such as 20 years. Rotation and translation of the first portion 114-1 relative to the second portion 114-2 should be kept below a minimum threshold limit. Embodiments of the sensor block 102 described here keep the portions 114 from shifting beyond small fractions of an inch. Such embodiments provide ways and apparatuses for keeping these environmental effects to a minimum threshold limit.

FIGS. 3A-3D are various views illustrating one embodiment for joining together the first and second portions 114-1 and 114-2 of the housing 112 of the sensor block 102 shown in FIGS. 2A and 2B.

As used herein, the region of each portion 114 of the housing 112 that mates with the other portion 114 of the housing 112 is referred to here as the "joining region" 118, where joining region 118-1 refers to the joining region of the first portion 114-1 and joining region 118-2 refers to the joining region of the second portion 114-2.

As shown in FIG. 3B, each of the joining regions 118-1 and 118-2 has a respective tapered flange 120 that extends into the interior of the housing 112. The tapered flange of the joining region 118-1 of the first portion 114-1 is referred to as the first tapered flange 120-1, and the tapered flange of the joining region 118-2 of the second portion 114-2 is referred to as the second tapered flange 120-2. When the joining regions 118-1 and 118-2 of the first and second portions 114 of the housing 112 are brought together, the combined tapered flanges 120-1 and 120-2 join together to form a v-shaped ridge 122 along an interior surface of the joining circumference 124.

Figure 3A:
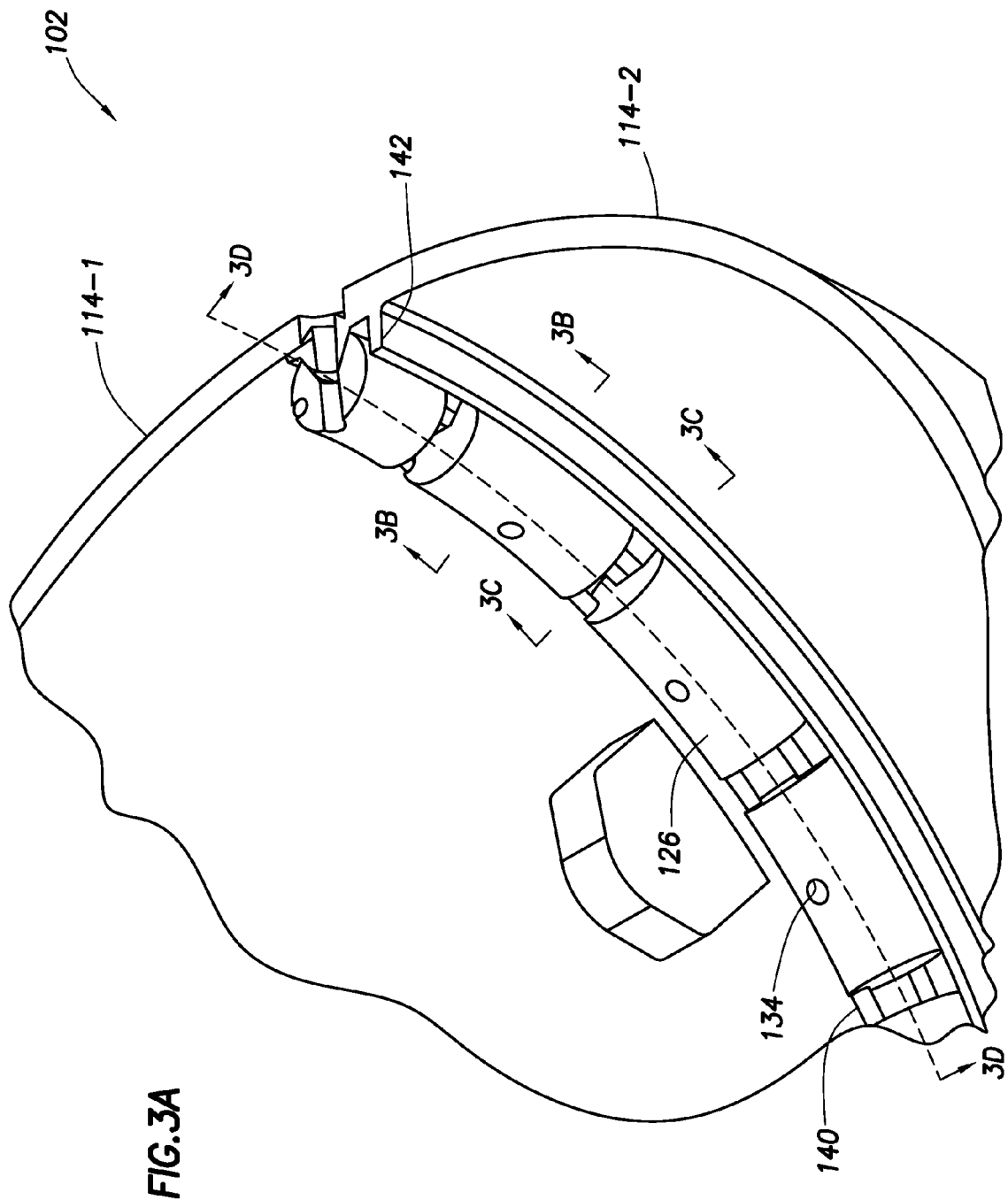
Figure 3D:
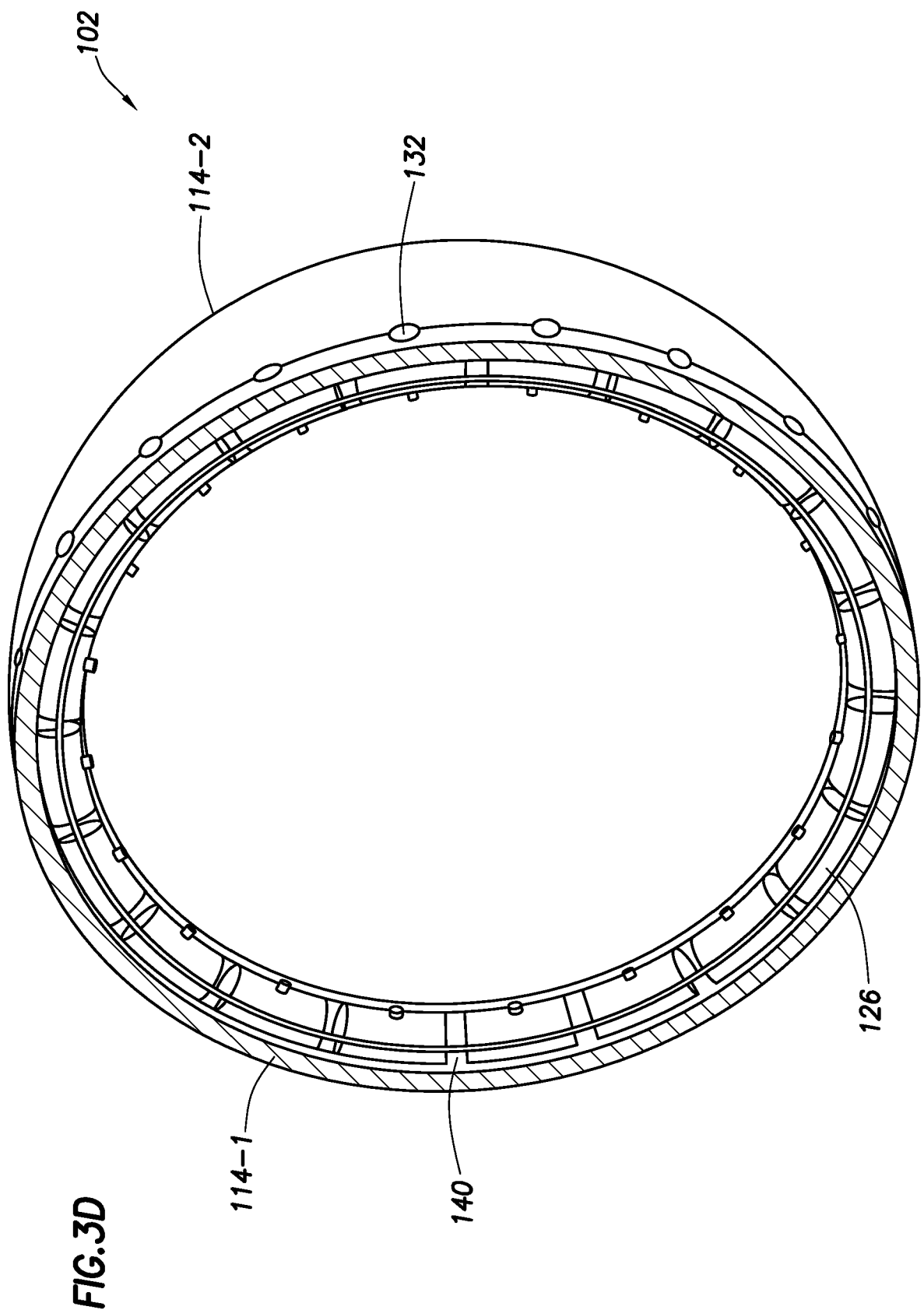

A plurality of collars 126, each having a v-shaped groove 128 formed therein (which is shown in FIGS. 3B and 3C), is used to press the first and second portions 114-1 and 114-2 of the housing 112 together. In FIG. 3D, only the joining region 118-1 of the first portion 114-1 of the housing 112 is depicted in order to show the plurality of collars 126. Each of the collars 126 is positioned over a respective portion of the v-shaped ridge 122 formed along the interior circumference 124 of the housing 112. The v-shaped groove 128 formed in each of the plurality of collars 126 is sized to be slightly smaller than the v-shaped ridge 122 formed by the tapered flanges 120-1 and 120-2 of the first and second portions 114-1 and 114-2 of the housing 112 so that, when the plurality of collars 126 is positioned over the v-shaped ridge 122 and pressed toward the interior surface of the housing 112, the v-shaped groove 128 formed in each of the plurality of collars 126 presses along the outer surfaces 130-1 and 130-2 of the tapered flanges 120-1 and 120-2 and clamps the first and second portions 114-1 and 114-2 together. The radial load placed on the collars 126 is transferred to a clamping load by the ramps of the v-shaped groove 128 and the v-shaped ridge 122.

A plurality of holes 132 is formed in the joining regions 118-1 and 118-2 along the joining circumference 124. In the particular embodiment shown in FIGS. 3A-3D, a respective half of each of the holes 132 is formed in each of the joining regions 118-1 and 118-2 of the first and second portions 114-1 and 114-2 of the housing 112. Each of the plurality of collars 126 includes a threaded hole 134 formed therein. Each of the plurality of collars 126 is positioned so that a respective bolt 136 (or similar fastener) can be inserted through a respective hole 132 of the housing 112 and screwed into the respective threaded hole 134 of the collar 126. When the fastener 136 is tightened, the fastener 136 presses the collar 126 toward the interior surface of the housing 112.

The plurality of fasteners 136 may be bolts, screws, clasps, or the like. The fasteners 136 may be comprised of aluminum, steel, tungsten, or any other suitable material. In one implementation of such an embodiment, the fasteners 136 are made of the same material as the housing 112 of the sensor block 102 in order to decrease the difference in thermal expansion between the fasteners 136 and the sensor block 102. In other implementations, the fasteners 136 may be made out of a material that differs from the housing 112. Also, in some implementations, in order to balance the sensor block 102, the fasteners 136 may vary in density, mass, length, type of material, or any other parameter that could aid in balancing the sensor block 102. Varying the properties of the fasteners 136 allows for fine adjustments to the balance of the sensor block 102 in two axes with minimal opening and closing of the assembly. The third axis of balance is achieved by additional fasteners 136 that are positioned toward or away from the center of the sensor block 102 and are placed on axes away from the joining circumference 124.

In the particular embodiment shown in FIGS. 3A-3D, each of the collars 126 also has a second groove 138 into which a flexible band 140 is inserted. The flexible band 140 is used to assist in positioning collars 126. The flexible band 140 is shaped to match the joining circumference 124 of the housing 112. In the particular embodiment shown in FIGS. 3A-3D where the sensor block 102 has spherical shape, flexible band 140 comprises an o-ring. Flexible band 140 may be composed of rubber, or of any other suitable material. Flexible band 140 fits into the groove 138 in the plurality of collars 126 and is used to hold collars 126 in place during the process of assembling the housing 112. Since tightening the fasteners 136 may cause the collars 126 to move closer to each other, it is desirable for the collars 126 to be positioned so that there are gaps between each of them and for flexible band 140 to be able to bend or compress as the fasteners 136 are tightened.

In the particular embodiments shown in FIGS. 3A-3D, a tooling shelf 142 is included on an inner surface of the housing 112. The tooling shelf 142 supports the plurality of collars 126 while they are being positioned during assembly. Tooling shelf 142 supports the plurality of collars 126 prior to and during the tightening of the fasteners 136. Either, or both, portions 114-1 or 114-2 of the housing 112 may have a tooling shelf.

The fasteners 136 and the collars 126 may be placed every few inches along the joining circumference 124. In one implementation of such an embodiment, the heads of the fasteners 136 are flush with the outer surface of the housing 112. In other implementations, the fasteners 136 sink approximately 2 millimeters to 3 millimeters below the outer surface of the housing 112. In yet other implementations, the shape of the heads of the fasteners 136 are matched to the outer surface of the sensor block 102. For example, in one example of such an implementation, if the sensor block 102 is spherical, the fasteners 136 have rounded heads to match the shape of the outer surface of the housing 112. In other implementations, the fasteners 136 have other shapes. Examples of suitable materials that the collars 126 can be formed of include aluminum, steel, tungsten, or any other suitable material. In some implementations of such an embodiment, each of the collars 126 may have an insert in which the threaded hole 134 is formed. For example, in one such implementation, the insert made of steel. In another implementation, the collars 126 are made of the same material as the sensor block 102 in order to decrease the difference in thermal expansion between the collars 126 and the sensor block 102. In order to balance the sensor block 102, the collars 126 may vary in density, mass, length, type of material, or any other parameter which could aid in proper balancing of the sensor block 102.

The clamping system described here can achieve a high rate of interchangeability of parts. In one embodiment, the portions 114-1 and 114-2 are independent so one can be interchanged with another design, manufacture date, or source. For example, a hemisphere could be replaced with another hemisphere since the portions can be nearly identical. The overall sensor block 102 is easy to disassemble and reassemble (requiring removal and replacement of the fasteners 136 and repositioning of the collars 126). Also, balancing requires less disassembly than typical solutions. In one embodiment, only some of the fasteners 136 have to be replaced to achieve a balanced sensor block 102.

Moreover, the joint between the first portion 114-1 and the second portion 114-2 of the housing 112 allows for disassembly and reassembly with very good repeatability of the alignment of the portions 114-1 and 114-2. Balance of the sensor block 102 can be finely adjusted by varying properties of the plurality of collars 126 and the fasteners 136 while minimizing disassembly of the sensor block 102 and while maintaining the shape of the sensor block 102 within threshold limits.

Figure 4:
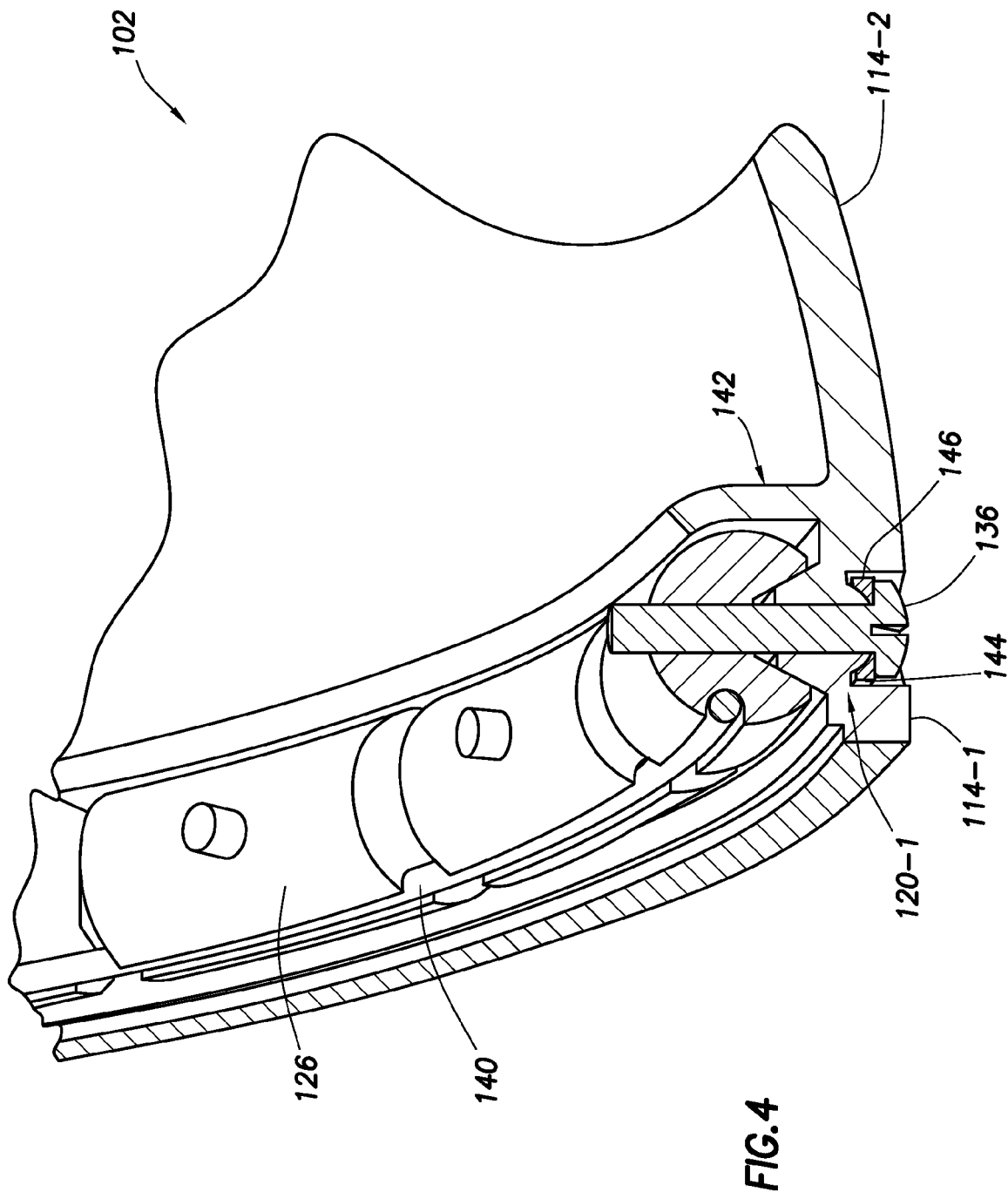
FIG. 4 shows an alternative embodiment of a sensor block suitable for use in the system of FIG. 1.

FIG. 4 shows an alternative embodiment of a sensor block 102 suitable for use in the system of FIG. 1. In this embodiment, the sensor block 102 (and the fastening system thereof) is the same as the sensor block 102 described above except as described here in connection with FIG. 4. Those parts of the sensor block 102 that are the same as the sensor block 102 described above are referenced in the following description using similar reference numerals.

In the embodiment of the sensor block 102 shown in FIG. 4, each of the holes 132 in the joining regions 118-1 and 118-2 of the housing 112 are formed so as to include a respective circular ring flange 144 that extends radially outward from the outer surface of the housing 112. In this embodiment, a respective half of each of the circular ring flanges 144 is formed in each the joining regions 118-1 and 118-2 of the first and second portions 114-1 and 114-2 of the housing 112. A tapered washer 146 is placed over each of the circular ring flanges 144. Each fastener 136 is inserted through a respective tapered washer 146 and a respective hole 132 of the housing 112 and screwed into the respective threaded hole 134 of the collar 126. When the fastener 136 is tightened, the fastener 136 presses the tapered washer 146 down onto the circular ring flange 144, which also presses first and second portions 114-1 and 114-2 of the housing 112 together.

Figure 5:
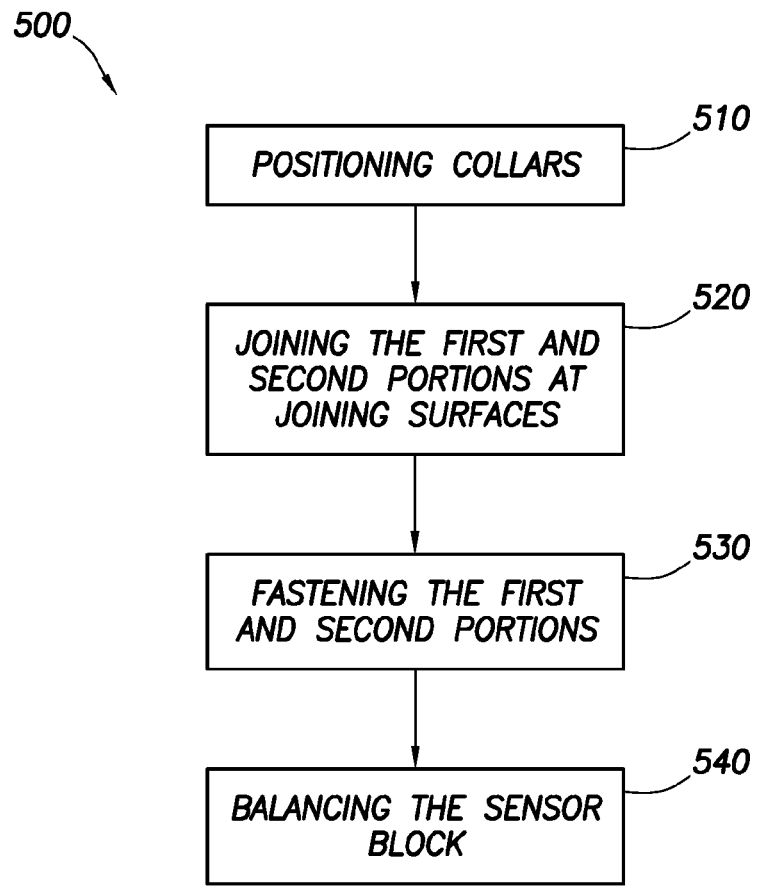
FIG. 5 is a flow chart illustrating one embodiment of a method for joining a sensor block.

FIG. 5 is a flow chart depicting one embodiment of a method 500 for joining a sensor block 102. Method 500 is described here as being implemented using the embodiment of the sensor block 102 described above in connection with FIGS. 1, 2A-2B, and 3A-3D (though other embodiments are implemented in other ways).

Method 500 begins at block 510. At block 510, the plurality of collars 126 is positioned on one of the portions 114-1 or 114-2 along the inside of the respective joining region 118-1 and 118-2. In one implementation of such an embodiment, the second portion 114-2 includes a tooling shelf 142. The plurality of collars 126 can be held in place on tooling shelf 142. As noted above, a flexible band 140 can be used to position and hold in place the plurality of collars 126 while the sensor block 102 is being assembled.

After the plurality of collars is positioned, method 500 moves to block 520. At block 520, first and second portions 114-1 and 114-2 are mated together so that respective inner surfaces of the joining regions 118-1 and 118-2 touch. The v-shaped groove 128 formed in each of the plurality of collars 126 is fitted over the v-shaped ridge 122 that is formed by the tapered flanges 120-1 and 120-2. In other embodiments, the ridge 122 is of a shape other than a v-shape, and groove 128 matches inversely the shape of ridge 122.

In one implementation of this embodiment, the first and second portions 114-1 and 114-2 are mated together in the following manner. Fasteners 136 are set into place on first portion 114-1 and partially threaded into the collars 126 prior to adding the second portion 114-2. The fasteners holes 132 being semicircular on each portion 114 allows the fasteners 136 to be laid in place prior to tightening. Laying fasteners 136 before tightening provides additional control over the positioning of the collars 126 once the second portion 114-2 is in place since limited access to the collars 126 is available once the portions 114 are joined. In other implementations, fasteners 136 are inserted at a later point in the joining process.

After the two portions 114-1 and 114-2 of the housing 112 are joined, method 500 proceeds to block 530. At block 530, first and second portions 114-1 and 114-2 are fastened together. In one implementation where fasteners 136 are partially threaded when portions 114-1 and 114-2 are mated in block 520, the fasteners 136 are tightened in block 530. In other implementations, the fasteners 136 are inserted into the holes 132 in the housing 112 and screwed into respective threaded holes 134 formed in the collars 126.

Each of the plurality of collars 126 is positioned so that a respective bolt 136 (or similar fastener) can be inserted through a respective hole 132 of the housing 112 and screwed into the respective threaded hole 134 of the collar 126. When the fastener 136 is tightened, the fastener 136 presses the collar 126 toward the interior surface of the housing 112. In one implementation, the fasteners 136 are bolts which pull the plurality of collars 136 radially outward until they engage the tapered flanges 120-1 and 120-2 of the first and second portions 114-1 and 114-2. In fastening first portion 114-1 to second portion 114-2, it is important that distortion of sensor block 102 is kept to a minimum threshold limit. Therefore, tightening fasteners 136 may proceed by tightening them alternatively on opposing sides of sensor block 102, in order to keep application of torque and loads evenly distributed during assembly.

Method 500 then proceeds to block 540. At block 540, sensor block 102 is balanced. The sensor block 102 may be balanced by changing the length or composition of some of the plurality of fasteners 136. Balancing of the sensor block 102 is important because balancing aids to prevent unwanted rotation of the sensor block 102 due to G loading. The torque applied by the gas jet assemblies 108 must be able to overcome the off balance torque in a high G environment.

A number of embodiments of the invention defined by the following claims have been described. Nevertheless, it will be understood that various modifications to the described embodiments may be made without departing from the spirit and scope of the claimed invention. For example, although the technique for joining multiple portions of a housing is described above in connection with embodiments in which the housing has a substantially spherical shape, the joining technique described here can be used with housings having other shapes (including, without limitation, cubes, pyramids, and cylinders) and with housings used in other applications. Accordingly, other embodiments are within the scope of the following claims.

What is claimed is:

1. An apparatus comprising:
a housing comprising at least first and second portions, wherein the first and second portions mate with each other at respective joining regions, wherein the first and second portions each comprise a respective tapered flange along an interior surface of the joining region;
wherein the first and second portions of the housing are connected to each other by placing a plurality of collars over the tapered flanges of the first and second portions of the housing, wherein each of the collars has a respective groove formed therein and wherein the grooves of the plurality of collars are placed over the tapered flanges of the first and second portions of the housing; and
wherein a plurality of fasteners cause the plurality of collars to press the first and second portions of the housing together.

2. The apparatus of claim 1, wherein a flexible band is used to position each of the plurality of collars.

3. The apparatus of claim 1, wherein the first portion is a portion of a sphere; and wherein the second portion is a portion of a sphere.

4. The apparatus of claim 1, wherein at least the first portion is similar in size to at least the second portion.

5. The apparatus of claim 1, wherein at least the first portion of the housing assembly contains a tooling shelf.

6. The apparatus of claim 1, wherein the physical parameters of the plurality of fasteners vary.

7. The apparatus of claim 1, wherein the first portion further includes instruments mounted thereon, and the second portion further includes instruments mounted thereon.

8. The apparatus of claim 1, further comprising a plurality of tapered washers, wherein each of the tapered washers fits over a respective ring flange in the joining region of the first and second portions.

9. The apparatus of claim 1, wherein the apparatus is incorporated into an inertial navigation system.

10. An inertial navigation system comprising:
a navigation unit; and
an inertial measurement unit communicatively coupled to the navigation unit, the inertial measurement unit comprising:
a sensor block; and
a plurality of gas pads, wherein the gas pads are configured to suspend the sensor block in gas;
wherein the sensor block comprises a housing comprising at least first and second portions, wherein the first and second portions mate with each other at respective joining regions, wherein the first and second portions each comprise a respective tapered flange along the joining region;
wherein the first and second portions of the housing are connected to each other by placing a plurality of collars over the tapered flanges of the first and second portions of the housing, wherein each of the collars has a respective groove formed therein and wherein the grooves of the plurality of collars are placed over the tapered flanges of the first and second portions of the housing; and
wherein a plurality of fasteners cause the plurality of collars to press the first and second portions of the housing together.

11. The inertial navigation system of claim 10, wherein at least one of instruments and sensors are housed within the housing of the sensor block.

12. The inertial navigation system of claim 11, wherein the at least one of instruments and sensors are configured to wirelessly communicate with the navigation unit, wherein the navigation unit is configured to process information communicated by the at least one of instruments and sensors.

13. The inertial navigation system of claim 11, wherein the at least one of instruments and sensors comprises at least one of accelerometers and gyroscopes.

14. The inertial navigation system of claim 11, wherein at least the first portion of the housing assembly contains a tooling shelf.

15. The inertial navigation system of claim 11, wherein the housing of the sensor block has a spherical shape.

16. A method for clamping at least a first portion and a second portion of a housing for an apparatus, wherein the first and second portions mate with each other at respective joining regions and wherein the first and second portions each comprise a respective tapered flange along an interior surface of the joining region, the method comprising:
positioning a plurality of collars over the tapered flange of the first portion of the housing;
joining at least the second portion to at least the first portion, wherein the plurality of collars is positioned over the tapered flanges the first and second portions; and
fastening at least the first portion to at least the second portion using a plurality of fasteners that engage the plurality of collars.

17. The method of claim 16, wherein positioning the plurality of collars over the tapered flange of the first portion of the housing further comprises:
using a tooling shelf on at least the first portion to support the plurality of collars.

18. The method of claim 16, wherein positioning the plurality of collars over the tapered flange of the first portion of the housing further comprises:
positioning the plurality of collars using a flexible band.

19. The method of claim 16, further comprising balancing the apparatus by doing at least one of varying the physical parameters of the plurality of fasteners, and varying the physical parameters of the plurality of collars.

20. The method of claim 16, wherein fastening at least the first portion to at least the second portion using the plurality of fasteners comprises positioning a tapered washer over a respective circular flange formed around a opening through which a respective one of the plurality of fasteners is inserted.

* * * * *